Patented Sept. 13, 1938

2,129,913

UNITED STATES PATENT OFFICE 2,129,913

ART OF DRILLING WELLS

Roy Cross and Walter M. Cross, Jr., Kansas City, Mo., assignors to Kansas City Testing Laboratory, Kansas City, Mo., a corporation of Missouri No Drawing. Application June 2, 1937, Serial No. 146,117

4 Claims. (Cl. 255—1)

This invention relates to the art of drilling oil and gas wells or for earth boring for other purposes, and more particularly to improvements in the drilling fluids ordinarily used in connection with the rotary drilling of oil wells.

In drilling oil wells as is well known various types of drilling fluids are used for various purposes. Thus, in order to increase the weight of an oil well drilling mud to withstand the back pressure of gas, water or oil encountered in the drilling, it has heretofore been proposed to add to the mud a weighting agent such as hematite, barytes and similar substances. To keep such weighting agents in suspension it is necessary to employ a suspending agent and for this purpose certain types of clays have been used. These clays may also have some value in sealing the walls of the drilling hole.

In recently issued patents, U. S. No. 2,044,758 and 2,073,413, granted to Roy Cross and Forbes Cross, the former being one of the joint inventors herein, improved processes and products are described, including among other things water soluble heavy metal salts such as zinc chloride as weighting agents for oil and gas well drilling fluids and zeolitic clays as suspension and wall building agents. Reference is made to these patents in explanation of the value of the present invention.

Among the objects of this invention is the provision of a new and improved type of wall sealing oil and gas well drilling fluid. A further object is to provide a new and improved method for sealing the walls of the drill holes in oil and gas wells and other types of earth bores. A still further object is to provide a new and improved type of drilling fluid which is both a weighting type of drilling fluid and a wall sealing fluid. Other objects will appear hereinafter.

In its broader aspects the invention relates to the use of solutions of cellulose as wall sealing agents in drilling fluids. Strictly speaking these so-called solutions may be more clearly described as colloidal solutions. The cellulose or cellulose hydrate exists in minute colloidal sized particles. The purpose of the cellulose in the composition is to give the fluid the viscosity desired which is ordinarily from 1 to 100 centipoises and to form an impervious shell on the structure against whose surface it is applied.

At the same time that the cellulose is incorporated into the drilling fluid for sealing purposes a highly concentrated solution of zinc chloride may be used for weighting purposes. The zinc chloride performs the double function not only of producing a heavier weighted fluid but also of acting as a solvent agent for the cellulose. This coaction between the zinc chloride and the cellulose is an important feature of the preferred method of practicing the invention. For example, a solution of zinc chloride in water containing from 30% to 50% by weight of zinc chloride will dissolve at the temperature of boiling water up to 10% of cellulose to produce a highly viscous gelatinous mixture which is peculiarly adaptable for use in the drilling of oil wells with rotary drills because of (1) Its weight, which may be as great as corresponds to a specific gravity of 2.25. In other words, a concentration of 30% to 82% of zinc chloride may be used.

(2) It is resistant to salt water naturally occurring in formations which flocculate many viscous mixtures. The cellulose and zinc chloride are not precipitated by sodium chloride though water precipitates cellulose hydrate.

(3) Cellulose may be precipitated on the wall of the hole to produce a fabric-like structure which prevents caving or further penetration and loss of fluid.

(4) Loss of circulation is eliminated due to the colloidal condition of the mixture and the high viscosity.

(5) The action of the cellulose prevents excessive corrosion action by the zinc chloride.

(6) Cellulose in connection with zinc chloride is a lubricant not only to the pump but also to the cutting action of the bit.

Other advantages are apparent from the description of drilling fluids given in the above referred to patents. As a general rule, the specific gravity of the mixture set out in this invention is between 1.30 and 2.25.

The invention will be further illustrated but is not limited by the following example:

Example

A zinc chloride solution containing 50% of water and 50% zinc chloride is steeped at a temperature of about 200° F. with 5% of cotton, cotton linters, straw, sawdust, cotton seed hulls, rags, wood pulp, rice hulls, or other source of cellulose, until the mixture is of a mucous-like consistency. It is ordinarily preferable to use as clean a source of cellulose as possible. This mixture in the quantity required is then introduced into the drill hole with a slush pump, circulated over the bit, back through screens or other cleaning equipment to the settling pits, and to the slush pit where it is again put into circulation. Subsequently or intermittently fresh water is circulated in the drill hole to precipitate the cellulose from the cellulose solution in the wall of the drill hole and effectively seal the wall of the hole.

The temperature at which the cellulose is heated with the zinc chloride solution may vary but should be at least sufficient to produce a colloidal solution of cellulose, that is, a solution or dispersion containing the cellulose substantially in the form of colloidal particles or in solution. The maximum temperature of heating, on the other hand, should preferably be below the temperature at which charring occurs which in some instances may be as low as 220° F. Ordinarily good results have been obtained by reacting the zinc chloride with the cellulose within the temperatures of about 180° F. to 212° F. The heating is effected until all or substantially all of the cellulose is in solution or in a colloidal form.

The concentration of the zinc chloride required to act upon and reduce the cellulose to a colloidal solution and the time of heating may vary depending upon such factors as the nature of the cellulose. Ordinarily, however, the desired results can be obtained with zinc chloride solutions having a concentration in excess of about 40% zinc chloride and preferably below the saturation point at the temperature employed.

It will be observed that drilling fluids containing colloidal solutions of zinc chloride and cellulose are especially suitable for wall sealing of drill holes because only dilution with water is required to precipitate the cellulose or cellulose hydrate. Certain types of cellulose, e. g., cotton fibers, in zinc chloride solution also gel on cooling and this action occurs when such solutions are brought in contact with the cooler ground surrounding the drill holes producing a rubber-like sheath. Certain other types of cellulose, e. g., cellulose such as used in filter paper, in zinc chloride solution form a mucous-like solution containing finely separated fibrous material which forms a mat on the wall of the drill hole.

While this is the preferred embodiment of the invention and one which has special advantages as above described, other types of cellulose in solutions which are capable of regeneration by dilution, treatment with acids, or by heating can be employed, as for example, cuprammonium solutions capable of regenerating cellulose by neutralization, cellulose xanthate solutions capable of regeneration of the cellulose by treatment with acid, and solutions of alkali salts of cellulose mono-esters of di-carboxylic acids which hydrolyze on heating to regenerate the cellulose, for example, sodium cellulose phthalate.

We claim:

1. In the art of drilling oil and gas wells the step which comprises circulating in the drill hole during the general drilling operation a drilling fluid containing cellulose in soluble form and adapted to be regenerated.

2. In the art of drilling oil and gas wells the step which comprises circulating in the drill hole during the general drilling operation a colloidal solution of cellulose and zinc chloride.

3. In the art of drilling oil and gas wells the step which comprises circulating in the drill hole during the general drilling operation a colloidal solution of cellulose and zinc chloride having a viscosity from 1 to 100 centipoises and a specific gravity of from 1.30 to 2.25.

4. In the art of drilling oil and gas wells the step which comprises circulating in the drill hole during the course of drilling the well a substantial quantity of zinc chloride solution in which cellulose is dissolved or suspended in colloidal condition.

ROY CROSS.
WALTER M. CROSS, Jr.